United States Patent [19]

Takata et al.

[11] Patent Number: 5,374,112
[45] Date of Patent: Dec. 20, 1994

[54] BRAKE FLUID PRESSURE CONTROL DEVICE

[75] Inventors: Koji Takata; Masato Yoshino, both of Itami, Japan

[73] Assignee: Sumitomo Electric Industries, Ltd., Osaka, Japan

[21] Appl. No.: 173,870

[22] Filed: Dec. 27, 1993

Related U.S. Application Data

[63] Continuation-in-part of Ser. No. 968,573, Oct. 29, 1992, abandoned.

[30] Foreign Application Priority Data

Oct. 30, 1991 [JP] Japan .................. 3-284876

[51] Int. Cl.$^5$ .................................................. B60T 8/32
[52] U.S. Cl. ........................... 303/113.2; 303/116.1; 303/119.1
[58] Field of Search ............... 303/113.1, 113.2, 116.1, 303/116.2, 115.1, 115.2, 119.1, 115.4, 115.5, 900, 901; 188/181 A, 181 R; 364/426.02, 426.03

[56] References Cited

U.S. PATENT DOCUMENTS

| | | | |
|---|---|---|---|
| 5,015,043 | 5/1991 | Resch | 303/113.2 X |
| 5,026,127 | 6/1991 | Arikawa | 303/116.1 X |
| 5,028,096 | 7/1991 | de la Broise | 303/115.4 |
| 5,076,647 | 12/1991 | Grana et al. | 303/113.2 |
| 5,123,716 | 6/1992 | Willmann | 303/119.1 X |
| 5,131,729 | 7/1992 | Wetzel | 303/111 X |
| 5,141,296 | 9/1992 | Arikawa | 303/116.1 X |
| 5,183,317 | 2/1993 | Gutzeit | 303/116.1 |
| 5,195,809 | 3/1993 | Burgdorf | 303/113.2 |
| 5,209,553 | 5/1993 | Burgdorf et al. | 303/116.1 |
| 5,271,667 | 12/1993 | Takata et al. | 303/116.1 X |

FOREIGN PATENT DOCUMENTS

| | | |
|---|---|---|
| 3831426 | 4/1989 | Germany . |
| 8913565 | 3/1991 | Germany . |
| 3940177 | 6/1991 | Germany . |
| 4001421 | 7/1991 | Germany . |
| 4017700 | 12/1991 | Germany . |
| 4028552 | 3/1992 | Germany . |
| 58-16946 | 1/1983 | Japan .................. 303/116.1 |
| 2238836 | 6/1991 | United Kingdom .......... 303/113.2 |
| 2239913 | 7/1991 | United Kingdom .......... 303/113.2 |
| 9105689 | 5/1991 | WIPO .................. 303/116.2 |

*Primary Examiner*—Andres Kashnikow
*Assistant Examiner*—Lee W. Young
*Attorney, Agent, or Firm*—Wenderoth, Lind & Ponack

[57] ABSTRACT

A brake fluid pressure control device has a wheel brake fluid pressure control valve having a discharge valve and provided in a main fluid passage extending from a master cylinder to wheel brakes. A discharged fluid reservoir is provided to temporarily store the brake fluid discharged from the discharge valve. A pump is provided to pump the brake fluid out of the discharged fluid reservoir and return it to the main fluid passage. A fluid supply passage branches from the main fluid passage at a point upstream of a flow return point from the pump and extends to the discharged fluid reservoir. A traction control changeover valve is provided to checking a fluid flow from the flow return point toward the master cylinder during traction control. A shutoff valve is provided to check a fluid flow from the fluid supply passage to the discharged fluid reservoir while the pressure in the master cylinder is being applied. The shutoff valve is a stroke responsive type check valve for checking a fluid flow from the fluid supply passage toward the discharged fluid reservoir if the amount of the brake fluid in the discharged fluid reservoir exceeds a predetermined level.

9 Claims, 3 Drawing Sheets

BRAKE FLUID PRESSURE CONTROL DEVICE

This application is a continuation-in-part of now abandoned application Ser. No. 07/968/573, filed on Oct. 29, 1992, now abandoned.

BACKGROUND OF THE INVENTION

The present invent ion relates to a brake fluid pressure control device of a simple structure and having the functions of both antilock and traction control.

The simplest antilock device is known as the so-called recirculating type which comprises a wheel brake fluid pressure control valve including a discharge valve provided in the main fluid passage extending from the master cylinder to each wheel brake, a discharged fluid reservoir for temporarily storing the brake fluid discharged from the discharge valve, and a pump or pumping the brake fluid out of the discharged fluid reservoir and returning it to the main fluid passage. If it is desired to add a traction control function to this device, the structure of the entire device can be simplified most effectively by using the circulation pump for the antilock device as a pressure source for traction control.

In order to employ such a structure, brake fluid has to be supplied to the inlet port of the pump. This can be done in several known ways.

These known ways are classified into two types. In one type, a fluid supply passage is provided so as to extend directly from the reservoir for the master cylinder to the pump inlet port. In the other type, the supply passage is provided to branch from the main passage connecting the master cylinder outlet port to each wheel brake. Of these two types, the latter is advantageous in view of easy mounting on a vehicle and the non-necessity of returning redundant brake fluid to the reservoir for the master cylinder through its inlet port.

The latter method, in which the fluid supply passage branches from the main fluid passage, requires a traction control changeover valve for checking fluid flow from the flow return point from the pump toward the master cylinder during traction control and shutoff valve for checking fluid flow from the fluid supply passage toward the discharged fluid reservoir during normal braking (when master cylinder pressure is applied). A solenoid or a pressure-responsive valve is ordinarily used as the shutoff valve.

But, a solenoid valve is not only relatively expensive, it also has a problem in that, if the valve were not returned to its inoperative position as soon as the brake pedal is depressed during traction control, the brake fluid in the master cylinder would flow into the discharged fluid reservoir, thereby making it impossible to get a sufficient brake force by depressing the brake pedal. In this state, the subsequent antilock control function may be lost, too. Thus, it is necessary to increase the reliability of the electric system, including the brake switch. This requires more cost than is apparent.

A pressure-responsive valve, which requires a cylinder/piston assembly for driving the valve body in response to the pressure, is also unsatisfactory in cost.

It is therefore an object of the present invention to provide a simple and low-cost brake fluid pressure control device of the type described above.

SUMMARY OF THE INVENTION

The characterizing feature of the present invention consists in their the piston in a discharged fluid reservoir, which in itself is an indispensable component, is used as a valve body driving means, and a stroke responsive type check valve is provided to check fluid flow from the fluid supply passage toward the discharged fluid reservoir when the amount of the brake fluid in the discharged fluid reservoir is larger than a predetermined level. This valve is used as a shutoff valve.

The shutoff valve can be used either in a device of a first type in which the traction control changeover valve is provided downstream of the branch point between the main fluid passage and the fluid supply passage so that the fluid supply passage always communicates with the main fluid passage, or in a device of a second type in which the traction control changeover valve is a three-port two-position valve provided at the branch point between the fluid supply passage and the main fluid passage so that the fluid supply passage communicates with the main fluid passage only during traction control.

In either of the above two types of devices, its performance can be improved by providing an intermediate fluid reservoir at such a position that it communicates with the fluid supply passage at least during traction control.

Since the stroke responsive type check valve is driven by the piston in the discharged fluid reservoir, which is an essential element of the reservoir, its structure is simple and its cost is low. Because of its simple structure, its reliability is high as compared with a solenoid valve or a pressure-responsive valve.

The intermediate fluid reservoir serves as a brake fluid supply source and thus helps to increase the brake fluid supply capacity to the pump. This serves to quickly increase the brake fluid pressure at the early stage of traction control.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENT

Figure 1:
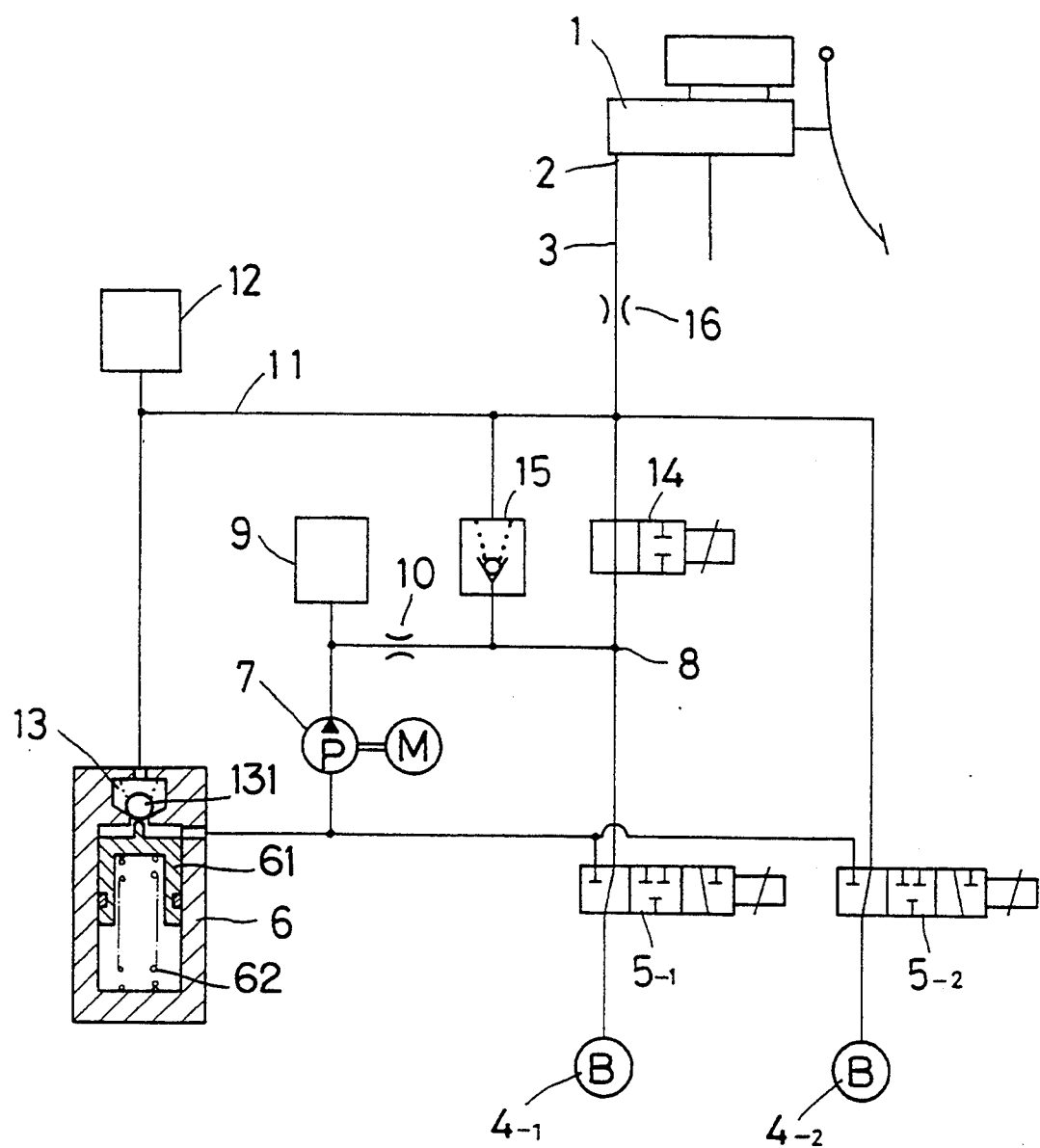
FIG. 1 is a circuit diagram of one example of the device according to the present invention.

FIG. 1 shows an example in which a main passage and a supply passage are normally in communication with each other and a traction control changeover valve is a two-port two-position valve provided between the point at which the supply passage branches from the main passage and the flow return point from the pump.

A master cylinder 1 (a booster of any type may be attached thereto) has two outlet ports. We shall describe hereinafter only one line of the two lines, because the same explanation or discussion is applicable to both lines.

Wheel brake fluid pressure control valves 5-1 and 5-2 are provided in respective main fluid passages connecting the outlet port 2 to wheel brakes 4-1 and 4-2. The wheel brake fluid pressure control valves may be of a three-position type (as shown in FIG. 1) having pressure-increase, pressure-hold and pressure-decrease positions, or a two-position type having no pressure-hold position. In many cases, a check valve (not shown) is attached to each of the control valves in parallel therewith to allow the brake fluid pressure to drop quickly when the pressure on the brake pedal is relaxed during antilock control.

When the brake fluid pressure control valves 5-1 and 5-2 are in their discharge positions, the wheel brakes 4-1 and 4-2 are in communication with a discharged fluid reservoir 6.

A pump 7 pumps the brake fluid out of the discharged fluid reservoir 6 and returns it to a flow return point 8 of the main fluid passage. In order to prevent a pulsating flow of the fluid discharged from the pump 7, a buffer fluid reservoir 9 and a throttle 10 are used in combination.

Described above is the basic structure of a recirculating type antilock brake fluid pressure control device. In order to add a traction control function to this device, the following elements are added.

A supply passage 11 is provided that branches from the main fluid passage at a point upstream of the flow return point 8 and extends to the discharged fluid reservoir 6.

The discharged fluid reservoir 6 is provided with a stroke responsive type check valve 13 which serves as a shutoff valve to prevent the flow of fluid from the fluid supply passage 11 to the discharged fluid reservoir 6 when the amount of brake fluid in the reservoir 6 exceeds a predetermined level and to allow the passage of fluid only while the amount of brake fluid in the reservoir is below the predetermined level.

A traction control changeover valve 14 is provided between the flow return point 8 and the branch point of the fluid supply passage to prevent the pressurized fluid from flowing back into the master cylinder during traction control. Also, in order to allow backward fluid flow toward the intermediate reservoir when the pump discharge pressure has increased excessively, a high-pressure (corresponding to the upper limit of the fluid pressure necessary for the traction control, e.g., 100 bar) relief valve 15 is provided in parallel with the changeover valve 14.

Further, in this embodiment, in order to further improve the performance of the device, there is provided an intermediate fluid reservoir 12 at such a point that it always communicates with the fluid supply passage 11. The intermediate fluid reservoir 12 may be a simple fluid chamber similar to the buffer fluid reservoir 9. But, for higher fluid supply capacity to the pump, it should preferably be provided with a volume control means for reducing the volume of the intermediate fluid reservoir 12 when the internal fluid pressure drops below atmospheric pressure, thereby keeping the internal pressure not much lower than the atmospheric pressure. Especially preferable as a volume control means is a diaphragm having a slight self-restoring force or a piston without a return spring, because, with these means, it is fairly easy for the intermediate fluid reservoir to recover its original volume at the completion of the traction control, before the brake fluid flows back into the master cylinder reservoir.

Also, by providing the intermediate fluid reservoir at such a position that it communicates with the main fluid passage 3 during antilock control, the pulsating flow from the pump can be further restrained. Namely, a throttle 16, which may be added as long as it would not hinder the normal braking performance, serves in cooperation with the intermediate fluid reservoir 12, to strengthen the buffering effect of the combination of the buffer fluid reservoir 9 and the throttle 10.

Figure 3:
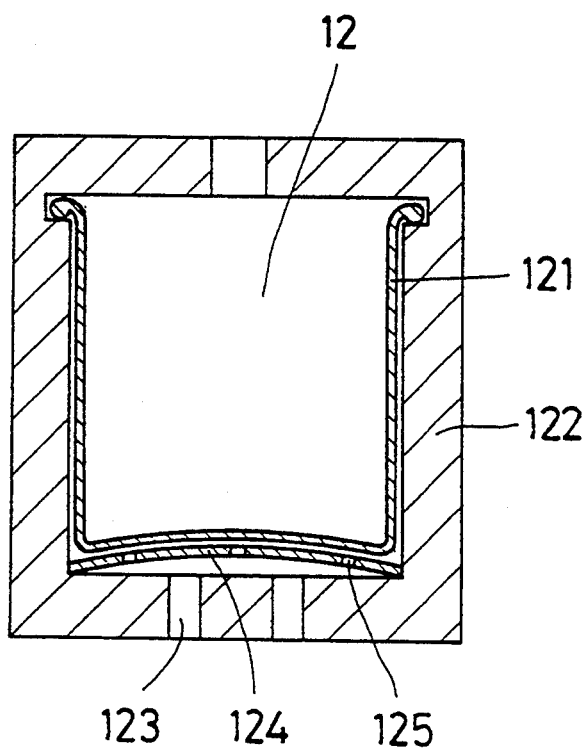
FIG. 3 is a cross-sectional view of an intermediate fluid reservoir.
Figure 4:
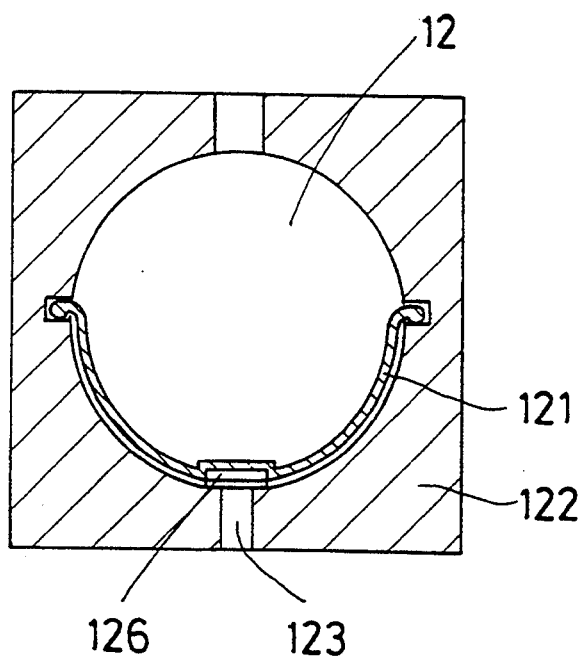
FIG. 4 is a cross-sectional view of another intermediate fluid reservoir.

FIGS. 3 and 4 show typical intermediate fluid reservoirs 12.

In FIG. 3, the intermediate fluid reservoir 12 has a diaphragm 121 made of a resilient material such as rubber. A metallic outer wall 122 is provided with vent holes 123. A slightly arched springy thin plate 124 is disposed between the outer wall 122 and the diaphragm 121 to prevent the diaphragm 121 from getting into the vent holes 123. A plurality of small holes 125 are formed in the thin plate 124 so as not to be overlapped with the vent holes 123. If a negative pressure is produced in the space defined by the diaphragm 121, the diaphragm will be deformed due to the atmospheric pressure that acts on the outside of the diaphragm through the vent holes 123, the space formed by the arched shape of the thin plate 124 and the holes 125. Thus, the internal volume in the fluid reservoir decreases until the internal pressure balances with the external pressure, at which time the deformation of the diaphragm stops. In this way, the internal pressure is kept at a value near the atmospheric pressure.

In this arrangement, the degree of arching of the thin plate 124 contributes to the initial dead stroke of the brake pedal. Thus, care must be taken that the thin plate is not arched excessively.

The structure shown in FIG. 4 is characterized in that the diaphragm 121 can be deformed easily and is more durable against the internal pressure. This structure is similar to one generally used as a high-pressure gas sealed accumulator. The only difference from the accumulator is that the portion used as the high-pressure gas chamber and the hydraulic fluid chamber in an ordinary accumulator are used, in this example, as a fluid storage chamber and an atmospheric chamber, respectively. In this example, in place of the above thin plate 124, a metal piece 126 molded integral with the diaphragm 121 prevents the diaphragm from getting into the vent holes 123.

The wheel brake 4-2 at the non-driven wheel side and the brake fluid pressure control valve 5-2 may be connected to the line branching from the point downstream of the traction control changeover valve 14 in the same manner as the wheel brake 4-1 and its brake fluid pressure control valve 5-1 at the driven wheel side. But preferably, they should be connected to a line branching from a point upstream of the valve 14. This is because, with this arrangement, it is not necessary to keep the control valve 5-2 activated during traction control, and the pressure on the non-driven wheel brakes can be increased instantly upon depression of the brake pedal. Of course, if the brake 4-2 is also a brake for the driven wheel, 4-2 and 5-2 must be arranged in the same manner as 4-1 and 5-1, i.e., downstream of traction control changeover valve 14.

When providing the stroke responsive type check valve 13 at the position shown in FIG. 1, the amount of fluid necessary for moving a piston 61 in the discharged fluid reservoir 6 from its stroke end to the position in which the check valve 13 is closed increases the initial dead stroke of the brake pedal. Thus, the piston stroke from the stroke end to the valve closing position should be made as short as possible.

The stroke responsive type check valve 13 has a critical pressure that is determined by the balance between the effective sectional area of the valve body 131 and the force of the return spring 62 in the discharged fluid reservoir 6. Thus, in the structure shown in FIG. 1, if the brake fluid in the discharged fluid reservoir 6 is completely pumped out by the pump 7 during the antilock control, and if the master cylinder pressure is lower than the critical pressure, the fluid supply passage 11 and the discharged fluid reservoir 6, which have been shut off from each other, would communicate again. Thus, the pump will keep discharging fluid, instead of running idle, with a discharge pressure which is equal to the master cylinder pressure at that moment.

Figure 2:
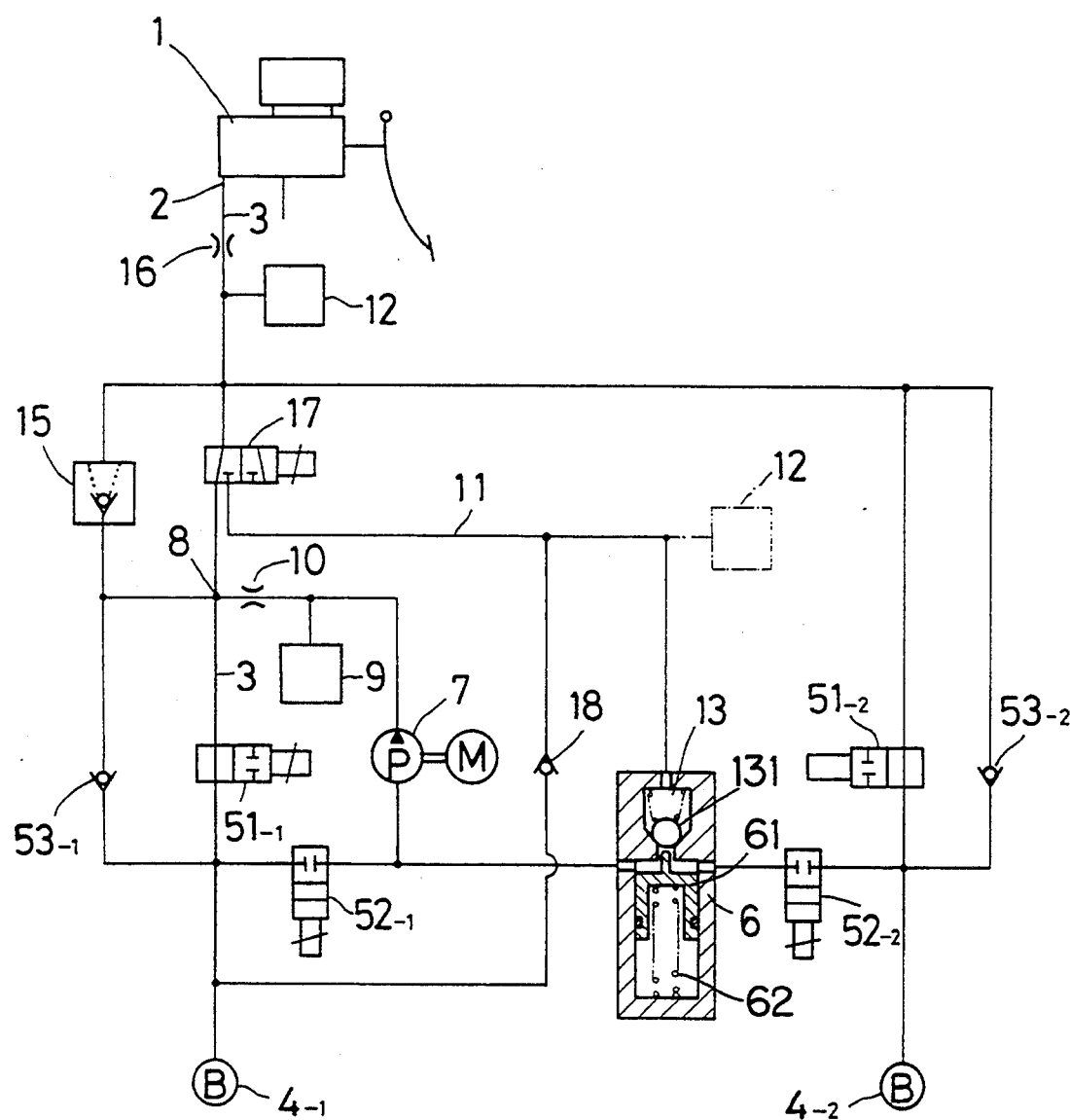
FIG. 2 is a circuit diagram of another embodiment.

But, the above critical pressure would not rise too high. As the stroke responsive type check valve 13 has to be provided downstream of the intermediate fluid reservoir 12, the valve body of the valve 13 has to have a considerably large effective sectional area in order to keep sufficiently low the flow line resistance in the valve which corresponds to the fluid intake resistance of the pump 7. On the other hand, the force of the return spring has to be sufficiently small because the lowest possible pressure reduction level of the brake fluid pressure control device is determined by the fluid pressure in the discharged fluid reservoir 6, which is in turn determined by the sectional area of the discharged fluid reservoir and the force of the return spring 62. As far as the master cylinder pressure is maintained at such a level, there will be no practical problem even if the pump fails to get into an idling state. But the structure of FIG. 2 can solve this problem as well as the problem, of the initial dead stroke.

in FIG. 2, the traction control changeover valve is a three-port two-position changeover valve 17 provided at the branch point between the main fluid passage 3 and the fluid supply passage 11.

With this arrangement, when the changeover valve 17 is in its inoperative position, it shuts the fluid supply passage 11 from the main fluid passage 3. In other words, the fluid supply passage 11 communicates with the main fluid passage only during traction control. This prevents the dead stroke of the brake pedal, which occurs only if the check valve is arranged in the manner as shown in FIG. 1. Also, the pump can get reliably into an idling state even if the master cylinder pressure is lower than the critical pressure.

FIG. 2 shows the driven wheel brake control valve 5-1 and the non-driven wheel brake control valve 5-2 as being separated, respectively, into three parts 51-1, 52-1 and 53-1 and 51-2, 52-2 and 53-2, of which 53-1 and 53-2 are check valves that are not shown in FIG. 1.

Also, by providing a circuit extending from the fluid supply passage 11 to the wheel brake 4-1 and providing a check valve 18 in this circuit, the wheel brake fluid pressure can be increased quickly even if the master cylinder is pushed in during traction control without the need for switching the changeover valve 17 to the pressure re-increase position.

Further, as shown in FIG. 2, by chain line, the intermediate fluid reservoir 12 may be provided not in the main fluid passage but in the fluid supply passage 11. Also, the relief valve 15 may be provided not between the flow return point and the main fluid passage but between the flow return point and the fluid supply passage.

If the intermediate fluid reservoir 12 is provided at the position shown by chain line, it is necessary that the intermediate fluid reservoir recover its initial volume at the end of traction control while the main fluid passage and the fluid supply passage are still in communication through the traction control changeover valve 17.

By providing a check valve 18, the restoring timing of the changeover valve 17 can be delayed properly to ensure that intermediate fluid reservoir reliably recovers its initial volume reliably.

What is claimed is:

1. A brake fluid pressure control device, comprising:
   a main fluid passage extending from a master cylinder to at least one wheel brake;
   a wheel brake fluid pressure control valve provided in said main fluid passage, said wheel brake fluid pressure control valve comprising at least a discharge valve;
   a discharged fluid reservoir connected to said discharge valve for temporarily storing brake fluid discharged from said discharge valve;
   a pump connected between said discharged fluid reservoir and a flow return point in said main fluid passage for pumping brake fluid out of said discharged fluid reservoir and returning the brake fluid to said main fluid passage;
   a fluid supply passage branching from said main fluid passage at a point between said flow return point and the master cylinder and extending to said discharged fluid reservoir;
   a traction control changeover valve on said main fluid passage between said flow return point and said master cylinder for checking fluid flow from said flow return point toward the master cylinder during traction control; and
   a shutoff valve between the master cylinder and said discharged fluid reservoir in said fluid supply passage for checking fluid flow from the master cylinder to said discharged fluid reservoir when the master cylinder is pressurized;
   wherein said shutoff valve is a stroke responsive check valve that comprises a valve body that is urged by brake fluid pressure in said fluid supply passage toward a closed position, a piston for moving said valve body between an open and the closed position and a biasing member biasing said piston in a direction of movement of said piston which moves said valve body toward the open position, said piston being urged by brake fluid pressure in said discharged fluid reservoir in a direction opposite to said direction in which said piston is biased, and wherein said piston moves against the biasing force of said biasing member to move said valve body toward the closed position if the amount of brake fluid in said discharged fluid reservoir exceeds a predetermined amount.

2. The brake fluid pressure control device of claim 1, wherein said fluid supply passage and said shutoff valve are arranged so as to be in constant fluid communication with said main fluid passage.

3. The brake fluid pressure control device of claim 2, and further comprising:
   an intermediate fluid reservoir located between the master cylinder and said shutoff valve, wherein said traction control changeover valve has an operative position for traction control and an inoperative position for no traction control, and said intermediate fluid reservoir is in fluid communication with said fluid supply passage at least when said traction control changeover valve is in the operative position.

4. The brake fluid pressure control device of claim 3, and further comprising a volume control device that reduces the interior volume of said intermediate fluid reservoir if the interior fluid pressure of said intermediate fluid reservoir drops below atmospheric pressure in order to maintain the interior fluid pressure at substantially the same level as atmospheric pressure and to allow said intermediate fluid reservoir to recover its initial volume before brake fluid flows into a master cylinder reservoir through a master cylinder inlet port when said brake fluid pressure control device is depressurized.

5. The brake fluid pressure control device of claim 1, wherein:
   said traction control changeover valve is located at said point where said fluid supply passage branches from said main fluid passage; and
   said traction control changeover valve is a three-port two position valve having an inoperative position and an operative position for selectively directing fluid flow from the master cylinder toward said flow return point of said pump or toward said fluid supply passage so as to maintain said fluid supply passage and said shutoff valve out of fluid communication with said main fluid passage when said traction control changeover valve is in its inoperative position.

6. The brake fluid pressure control device of claim 5, and further comprising:
   an intermediate fluid reservoir located between the master cylinder and said shutoff valve, wherein said intermediate fluid reservoir is in fluid communication with said fluid supply passage at least when said traction control changeover valve is in the operative position.

7. The brake fluid pressure control device of claim 6, and further comprising a volume control device that reduces the interior volume of said intermediate fluid reservoir if the interior fluid pressure of said intermediate fluid reservoir drops below atmospheric pressure in order to maintain the interior fluid pressure at substantially the same level as atmospheric pressure and to allow said intermediate fluid reservoir to recover its initial volume before brake fluid flows into a master cylinder reservoir through a master cylinder inlet port when said brake fluid pressure control device is depressurized.

8. The brake fluid pressure control device of claim 1, and further comprising:
   an intermediate fluid reservoir located between the master cylinder and said shutoff valve, wherein said traction control changeover valve has an operative position for traction control and an inoperative position for no traction control, and said intermediate fluid reservoir is in fluid communication with said fluid supply passage at least when said traction control changeover valve is in the operative position.

9. The brake fluid pressure control device of claim 8, and further comprising a volume control device that reduces the interior volume of said intermediate fluid reservoir if the interior fluid pressure of said intermediate fluid reservoir drops below atmospheric pressure in order to maintain the interior fluid pressure at substantially the same level as atmospheric pressure and to allow said intermediate fluid reservoir to recover its initial volume before brake fluid flows into a master cylinder reservoir through a master cylinder inlet port when said brake fluid pressure control device is depressurized.

* * * * *